(12) United States Patent
George, Sr.

(10) Patent No.: US 10,801,229 B1
(45) Date of Patent: Oct. 13, 2020

(54) REMOTELY ACTIVATED TELESCOPING FLAGPOLE WITH AC AND/OR DC VOLTAGE

(71) Applicant: Donald A. George, Sr., Ramona, OK (US)

(72) Inventor: Donald A. George, Sr., Ramona, OK (US)

( * ) Notice: Subject to any disclaimer, the term of this patent is extended or adjusted under 35 U.S.C. 154(b) by 0 days.

(21) Appl. No.: 16/001,078

(22) Filed: Jun. 6, 2018

Related U.S. Application Data

(60) Provisional application No. 62/515,825, filed on Jun. 6, 2017.

(51) Int. Cl.
| | | |
|---|---|---|
| *E04H 12/18* | (2006.01) | |
| *G09F 17/00* | (2006.01) | |
| *F16B 7/10* | (2006.01) | |
| *E04H 12/32* | (2006.01) | |
| *E04H 12/22* | (2006.01) | |

(52) U.S. Cl.
CPC ....... *E04H 12/182* (2013.01); *E04H 12/2215* (2013.01); *E04H 12/32* (2013.01); *F16B 7/10* (2013.01); *G09F 17/00* (2013.01)

(58) Field of Classification Search
CPC ... E04H 12/182; E04H 12/2215; E04H 12/32; G09F 17/00; F16B 7/10
See application file for complete search history.

(56) References Cited

U.S. PATENT DOCUMENTS

| | | | | |
|---|---|---|---|---|
| 859,233 A | * | 7/1907 | Lane | E04H 12/182 52/111 |
| 1,383,234 A | * | 6/1921 | Raguse | E04H 12/32 116/173 |
| 1,645,645 A | * | 10/1927 | Davis | E04H 12/003 116/173 |
| 2,377,219 A | * | 5/1945 | Ellis | G09F 17/00 116/173 |
| 2,630,779 A | * | 3/1953 | Mader | E04H 12/32 116/173 |
| 2,819,547 A | * | 1/1958 | Clements, Jr. | E01F 9/646 40/612 |
| 2,985,261 A | * | 5/1961 | Kubesh | E04H 12/187 52/120 |
| 3,418,967 A | * | 12/1968 | Donkersloot | G09F 17/00 116/173 |
| 3,675,616 A | * | 7/1972 | McInnis | G09F 17/00 116/173 |
| 3,792,680 A | * | 2/1974 | Allen | G09F 17/00 116/173 |
| 3,923,001 A | * | 12/1975 | Murdock | G09F 17/00 116/173 |
| 3,952,695 A | * | 4/1976 | Vollstedt | E04H 12/003 116/173 |
| 4,079,555 A | * | 3/1978 | Barnes | E04H 12/32 116/173 |

(Continued)

*Primary Examiner* — Nimeshkumar D Patel
*Assistant Examiner* — Tania Courson
(74) *Attorney, Agent, or Firm* — Margaret Millikin

(57) ABSTRACT

The present invention is a remotely activated flag pole that raises and lowers a flag automatically and stores a flag within the hollow flag pole assembly when the flag is lowered. The flag pole includes a cap that lowers into place over the flag receiving section as the flag is lowered and allows the stored flag to remain dry and out of the weather when the flag is in its lowered stored position.

16 Claims, 1 Drawing Sheet

(56) References Cited

U.S. PATENT DOCUMENTS

| | | | | |
|---|---|---|---|---|
| 4,918,896 A | * | 4/1990 | Wiese | E04H 12/182 |
| | | | | 52/632 |
| 4,972,794 A | * | 11/1990 | Smyly, Sr. | E04H 12/32 |
| | | | | 116/173 |
| 5,101,215 A | | 3/1992 | Creaser, Jr. | |
| 5,373,287 A | * | 12/1994 | Doublet | G09F 17/00 |
| | | | | 116/173 |
| 5,454,202 A | * | 10/1995 | van der Weijden | E04H 12/32 |
| | | | | 116/173 |
| 5,557,892 A | | 9/1996 | Lavin | |
| 5,983,825 A | * | 11/1999 | Nowak | G09F 17/00 |
| | | | | 116/173 |
| 6,247,991 B1 | | 6/2001 | Chen | |
| 6,494,636 B1 | | 12/2002 | Mozena | |
| 6,582,105 B1 | * | 6/2003 | Christensen | B60Q 1/2657 |
| | | | | 340/12.5 |
| 6,883,459 B2 | * | 4/2005 | Maki | G09F 17/00 |
| | | | | 116/173 |
| 6,955,456 B2 | * | 10/2005 | Schroeder | G09F 17/00 |
| | | | | 362/223 |
| 7,311,061 B1 | | 12/2007 | Wiese | |
| 8,137,008 B1 | * | 3/2012 | Mallano | B60R 11/04 |
| | | | | 396/427 |
| 8,910,431 B2 | * | 12/2014 | Egan | E04H 12/345 |
| | | | | 52/116 |
| 9,405,173 B1 | * | 8/2016 | Okunami | H04N 7/142 |
| 2001/0010201 A1 | * | 8/2001 | Otterness | G09F 17/00 |
| | | | | 116/173 |
| 2007/0089663 A1 | * | 4/2007 | Dunbar | B63B 35/815 |
| | | | | 116/173 |
| 2007/0220790 A1 | * | 9/2007 | Wagter | G09F 17/00 |
| | | | | 40/218 |
| 2008/0121167 A1 | * | 5/2008 | Randall | G09F 17/00 |
| | | | | 116/173 |
| 2009/0170620 A1 | * | 7/2009 | Smith | A63B 71/06 |
| | | | | 473/150 |
| 2010/0101479 A1 | | 4/2010 | Grahl et al. | |
| 2012/0167815 A1 | * | 7/2012 | Tait | G09F 17/00 |
| | | | | 116/173 |
| 2014/0062188 A1 | * | 3/2014 | Watanabe | F21V 21/10 |
| | | | | 307/18 |

* cited by examiner

REMOTELY ACTIVATED TELESCOPING FLAGPOLE WITH AC AND/OR DC VOLTAGE

CROSS-REFERENCE TO RELATED APPLICATIONS

This application claims priority to U.S. provisional application Ser. No. 62/515,825, entitled REMOTELY ACTIVATED TELESCOPING FLAGPOLE, filed Jun. 6, 2017, the entirety of which is incorporated herein by reference.

BACKGROUND OF THE INVENTION

1. Field of the Invention

The present invention relates to a flagpole and more specifically to a remotely actuated flagpole.

2. Description of the Related Art

Flagpoles employed for displaying flags have been used for years. Older versions of flagpoles were constructed of a single pole to which a pulley system was attached for raising and lowering the flag to be displayed.

Newer versions of flagpoles are often constructed of telescoping aluminum poles that can be raised and lowered manually. Manually raising and lowering a flag can be quite challenging to older or handicapped individuals.

The present invention addresses this problem by providing a remotely activated flagpole that raises and lowers a flag automatically and stores a flag within the flagpole assembly when the flag is lowered. The flagpole includes a cap that lowers into place over the flag receiving section as the flag is lowered and allows the stored flag to remain dry and out of the weather when the flag is in its lowered stored position.

SUMMARY OF THE INVENTION

The present invention is a remotely activated flagpole that raises and lowers a flag automatically and stores a flag within the hollow flagpole assembly when the flag is lowered. The flagpole includes a cap that lowers into place over the flag receiving section as the flag is lowered and allows the stored flag to remain dry and out of the weather when the flag is in its lowered stored position.

DETAILED DESCRIPTION OF THE PREFERRED EMBODIMENT

Figure 1:
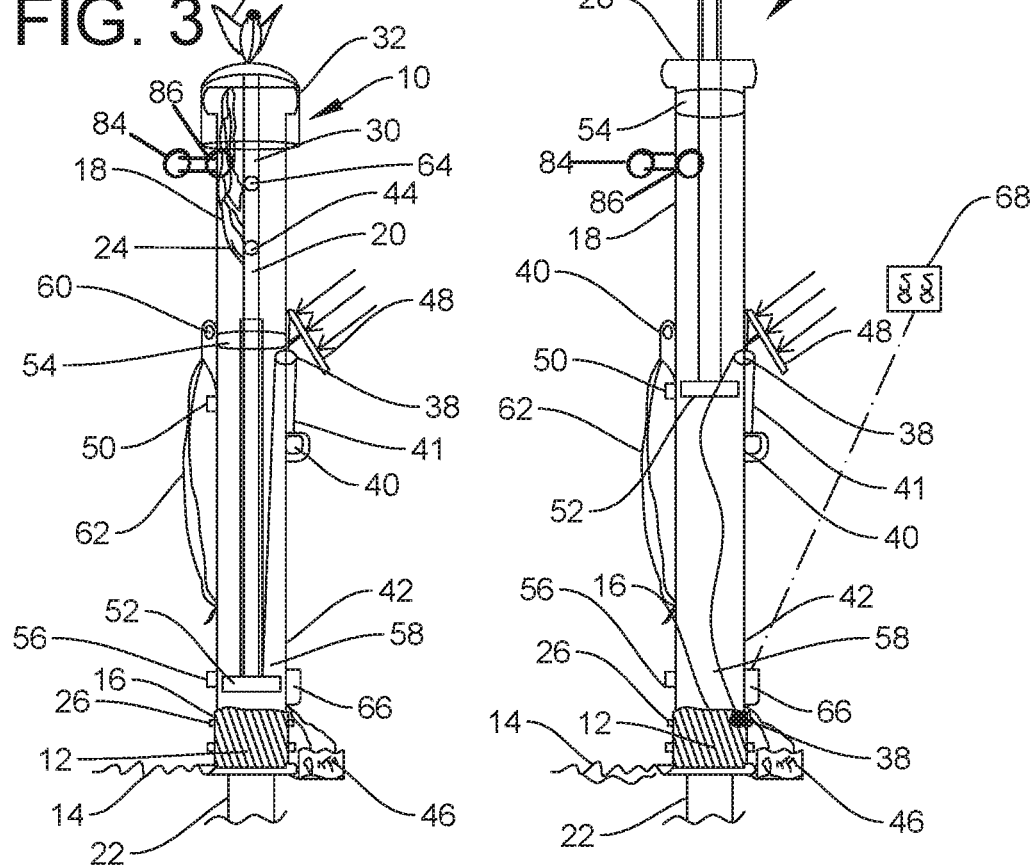
FIG. 1 is a side view of a remotely activated flagpole shown in a fully extended position with a flag being displayed.

Referring now to the drawings and initially to FIG. 1, there is shown a remotely activated flagpole 10 that is constructed in accordance with a preferred embodiment of the present invention. The flagpole 10 consists of a base 12 that is secured in the ground 14 and has an upper portion 16 that extends above ground 14, a hollow flag receiving section 18 that attaches to the base 12 and extends upward for approximately twenty feet, and an extendable pole 20 which is telescopically received within the flag receiving section 18.

The base 12 is approximately four feet long and the majority of its length is buried in the ground 14 and preferably is held securely in the ground 14 by concrete poured around a lower portion 22 of the base 12. The upper portion 16 of the base 12 extends above ground 14 and the flag receiving section 18 is pivotally secured to this upper portion 16 of the base 12. The pivotal connection 26 between the upper portion 16 of the base 12 and the flag receiving section 18 allows the flag receiving section 18 and the extendable pole 20 to be rotated and pivoted relative to the base 12, allowing them to be lowered to the ground for repairs, to replace the flag 24, etc.

Figure 3:
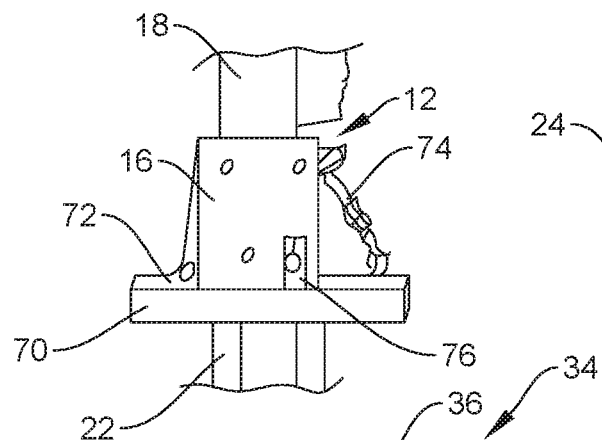
FIG. 3 is an enlarged view of the base of the flagpole for FIG. 1.

FIG. 3 shows the upper portion 16 of the base 12 in detail. A horizontal plate 70 is provided between the upper portion 16 and the lower portion 22 of the base 12. A hinge 72 attaches to the plate 70 and to the upper portion 16 so that the upper portion 16 can pivot downward to a horizontal position when a turn buckle 74 that is provided on an opposite side of the upper portion 16 of the base 12 from the hinge 72 is released. The turn buckle 74 serves to hold the flagpole upright in a vertical position when the flagpole 10 is in use. The base 12 is also provided with a lock 76 that is in its locked position when the flagpole 10 is in use in its vertical position. When the lock 76 is moved to an unlocked position, the flagpole 10 can be rotated relative to the base 12.

Figure 2:
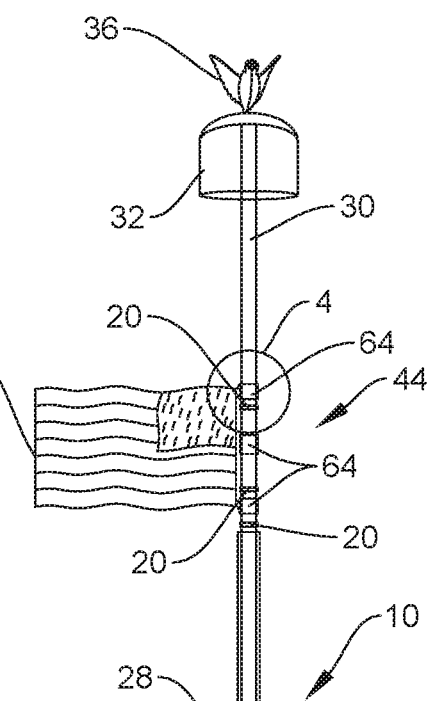
FIG. 2 is the flagpole of FIG. 1 shown in its fully retracted, lowered stored position with the flag contained within the flag receiving section of the flagpole and a cap that is provided on the flagpole having been lowered along with the flag so that it covers the flag receiving section.

The flag 24 receiving section 18 is hollow and is open on its top end 28 to allow the extendable pole 20 and an attached flag 24 to be received therein, as shown in FIG. 2, when the flag 24 is to be stored. FIG. 1 shows the flag 24 and extendable pole 20 fully extended so that the flag 24 is displayed on the extendable pole 20.

The top end 30 of the extendable pole 20 is provided with a cap 32 that is located a sufficient distance from the flag 24 so that the cap 32 covers the open top end 28 of the flag receiving section 18 when the flag 24 has been fully received or retracted within the flag receiving section 18 as the extendable pole 20 moves to the lowered stored position 34, as shown in FIG. 2. The cap 32 serves to prevent rain and snow from entering the flag receiving section 18 when the flag 24 is not being displayed. A decorative element 36, such as the eagle shown in the drawings, may be attached on top of the cap 32.

Attached to the flag receiving section 18 is a pulley 38 and an electrically powered AC or DC winch motor 40 for raising the extendable pole 20. A cable 41 running from the electric motor 40 to the bottom 42 of the extendable pole 20 serves to raise the extendable pole 20 to the fully extended position 44 shown in FIG. 1. The winch motor 40 is preferably located at a sufficient height on the flag receiving section 18 so as to be out of the reach of children. The electric motor 40 is powered by a battery 46 and is provided with a solar panel 48 for recharging the battery 46. Alternately the electric motor 40 can be powered by line current. If line current is employed, a power converter (not illustrated) must be used to convert the alternating current (AC) to DC power.

When the extendable pole 20 is in the fully extended or raised position 44, an upper limiting switch 50 provided on the top end 28 of the flag receiving section 18 senses when a magnet 52 that is located in the bottom 42 of the extendable pole 20 approaches the upper limiting switch 50. This activates the upper limiting switch 50 which in turn deactivates the electric motor 40 and holds the flag 24 and extendable pole 20 in the fully extended position 44. The extendable pole 20 is provided with a stabilizing bushing 54 which helps to provide support and stability to the extendable pole 20 when it is deployed to the fully extended position 44.

To lower the flag 24 and the extendable pole 20, the cable 41 is disengaged from the electric motor 40 and this will allow the extendable pole 20 to lower or retract under its own weight to the lowered stored position 34 shown in FIG. 2. A lower limit switch 56 provided at a bottom end 58 of the flag receiving section 18 senses when the magnet 52 in the bottom 42 of the extendable pole 20 approaches the lower limiting switch 56. This activates the lower limiting switch 56 which in turn causes the extendable pole 20 to stop descending and holds the extendable pole 20 in the lowered stored position 34.

The flag receiving section 18 is provided with a second manual pulley 60 and manual cable 62 for raising and lowering the extendable pole 20 and attached flag 24. The second manual pulley 60 and manual cable 62 are secondary means of raising and lowering the extendable pole 20 and flag 24 and are used on those occasions when the flag 24 is to be displayed at half-mast or half-staff.

Figure 4:
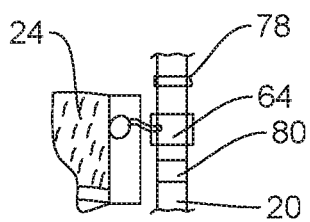
FIG. 4 is an enlarged view of the area of the flagpole within circle 4 of FIG. 1.

Referring to FIG. 4, the flag 24 is secured to the extendable pole 20 with hook and float bushings 64 which allow the flag 24 to rotate around the extendable pole 20 three hundred sixty (360) degrees so that the flag 24 will not become entangled as it is blown around in the wind. Each bushing 64 is preferably constructed of aluminum and is captured or retained between an upper stop 78 and a lower stop 80.

The flagpole 10 is provided with a control box 66 that controls the operation of the winch motor 40 and switches 50 and 56 and receives remote signals from a transmitter 68 that can be used for remotely activating the flagpole 10 to deploy and retract the extendable pole 20 and attached flag 24.

The flagpole 10 is preferably constructed of a noncorroding material such as aluminum or a powder-coated or other similarly coated material.

The flagpole 10 may be provided with lighting 84 and timers 86, and other accessories to customize the flagpole 10.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

I claim:

1. A telescoping flagpole comprising:
a base securable to the ground, the base having an upper portion that extends above the ground;
a flag receiving section attachable to the base and extending vertically therefrom, wherein the flag receiving section is attachable to the upper portion of the base;
an extendable pole receivable in the flag receiving section, wherein a flag attachable to the extendable pole is receivable within the flag receiving section when the pole telescopes to the ground, wherein the flag receiving section is hollow and has an open top end for receiving the extendable pole and the flag when the flag is received within the flag receiving section as the extendable pole moves to a lowered position;
a pulley and an electric motor for raising and lowering the extendable pole, wherein the electric motor is powered by line current and further comprises a power converter to convert from alternating current to direct current;
a magnet situated in the bottom of the extendable pole and an upper limiting switch on the top end of the flag receiving section, wherein the upper limiting switch senses when the magnet that is located in the bottom of the extendable pole approaches the upper limiting switch thus activating the upper limiting switch, which in turn deactivates the electric motor and holds the flag and extendable pole in the fully extended position; and
wherein the flag is secured to the extendable pole with at least one hook and at least one float bushing, the float bushing retained between an upper stop and a lower stop, allowing the flag to rotate around the extendable pole three hundred sixty degrees.

2. The telescoping flagpole of claim 1 wherein the flag receiving section is pivotally securable to the upper portion of the base and permits the flag receiving section to be rotated and pivoted relative to the base.

3. The telescoping flagpole of claim 2 wherein the base further comprises a lower portion, a plate configurable between the upper portion and the lower portion of the base, a hinge attachable to the plate and to the upper portion of the base and a turn buckle provided on the upper portion of the base and opposite of the hinge, wherein the upper portion pivots downward to a horizontal position when the turn buckle is released.

4. The telescoping flagpole of claim 3 wherein the turn buckle holds the flagpole upright in a vertical position when the flagpole is in use.

5. The flagpole of claim 1 further comprising a lock that holds the flagpole in a stationary position when in a locked position and that permits the flagpole to be rotated relative to the base when in an unlocked position.

6. The flagpole of claim 1 wherein the extendable pole further comprises an open top end and a cap situated at the top end of the extendable pole, the cap located a sufficient distance from the flag so that the cap covers the open top end of the flag receiving section.

7. The flagpole of claim 6 further comprising a decorative element atop the cap.

8. The flagpole of claim 1 wherein the extendable pole has a bottom, the flagpole further comprising a cable running from the electric motor to the bottom of the extendable pole.

9. The flagpole of claim 8 wherein the flag and the extendable pole are lowered by disengaging the cable from the electric motor, which allows the extendable pole to lower or retract under its own weight to a lowered position.

10. The flagpole of claim 1 wherein the motor is powered by a rechargeable solar powered battery and further comprises a solar panel for recharging the battery.

11. The flagpole of claim 1 further comprising a lower limiting switch provided at a bottom end of the flag receiving section.

12. The flagpole of claim 11 wherein the lower limiting switch senses when the magnet in the bottom of the extendable pole approaches the lower limiting switch thus activating the lower limiting switch, which in turn causes the extendable pole to stop descending and holds the extendable pole in the lowered stored position.

13. The flagpole of claim 11 further comprising a control box for controlling the motor and switches, the control box capable of receiving remote signals from a transmitter for remotely activating the flagpole.

14. The flagpole of claim 1 wherein the extendable pole further comprises a stabilizing bushing.

15. The flagpole of claim 1 wherein the flag receiving section further comprises a manual pulley and a manual cable for raising and lowering the extendable pole and flag.

16. The flagpole of claim 1 further comprising light features and timers.

* * * * *